Patented Jan. 3, 1933

1,893,226

UNITED STATES PATENT OFFICE

HOWARD M. CHILES, OF CHAMPAIGN, ILLINOIS, ASSIGNOR TO PYRO-PACK PRODUCTS CO., OF CHICAGO, ILLINOIS, A CORPORATION OF ILLINOIS

WATER SOLUBLE DI-IODO-HYDROXY-MERCURY FLUORESCEIN

No Drawing.    Application filed August 18, 1930. Serial No. 476,241.

This invention relates to certain new and useful soluble chemical compounds of di-iodo-hydroxy-mercury fluorescein and particularly to a new and useful germicide and to the method of preparing the same.

A further object is to provide a new compound and method of making the same which compound may be used as a dye or coloring matter which is particularly adaptable for use with lipsticks, which will not only provide the desirable coloring matter but which will at the same time have germicidal properties. The invention consists in the chemical compound and the method of making the same which compound has the formula $C_{20}H_8R_2O_6HgI_2$ where $R_2$ represents any alkaline radicle such as $Na_2$, $K_2$ or $(NH_4)_2$.

In preparing the new compound I dissolve di-iodo-hydroxy-mercury fluorescein in a water solution of either sodium hydroxide potassium hydroxide or ammonium hydroxide and evaporate the solution to substantial dryness. By recrystallization or precipitation these salts may be obtained in a comparatively pure state. The di-iodo-hydroxy-mercury fluorescein mentioned may be prepared according to the method described in my co-pending application Serial No. 21,765, filed April 8th, 1925 or I may use the product described in the said copending application which may have been prepared by some other method. The sodium salt of the above compound may be prepared by dissolving 100 grams of di-iodo-hydroxy-mercury fluorescein ($C_{20}H_{10}O_6HgI_2$) in 10.0002 grams of sodium hydroxide dissolved in distilled water and allowing the solution thus obtained to evaporate to substantial dryness. The resulting compound will be di-sodium-di-iodo-hydroxy-mercury fluorescein having the formula ($C_{20}H_8O_6HgI_2Na_2$).

The other salts of potassium or ammonium may be prepared by the same method whereinthe chemical equivalent of potassium or ammonium is used.

The probable structural formula for the di-sodium-salt of di-iodo-hydroxy-mercury fluorescein is as follows:

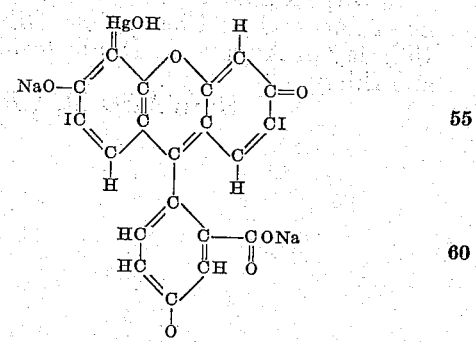

This is the soluble form of the compound and one which has been found particularly favorable.

It will be obvious to those skilled in the art that various changes may be made in my compound without departing from the spirit of the invention and therefore I do not limit myself to what is described in the specification, but only as indicated in the appended claims.

Having thus fully described my said invention, what I claim as new and desire to secure by Letters Patent, is:

1. The herein described compound which corresponds to the chemical formula $C_{20}H_8R_2O_6HgI_2$ where R represents one of the group consisting of sodium, potassium and ammonium, substantially as set forth.

2. The herein described compound consisting of di-sodium-di-iodo-hydroxy-mercury fluorescein which corresponds to the chemical formula $C_{20}H_8O_6HgI_2Na_2$, substantially as set forth.

3. The herein described compound consisting of di-sodium-di-iodo-hydroxy-mercury fluorescein having the following probable structural formula:

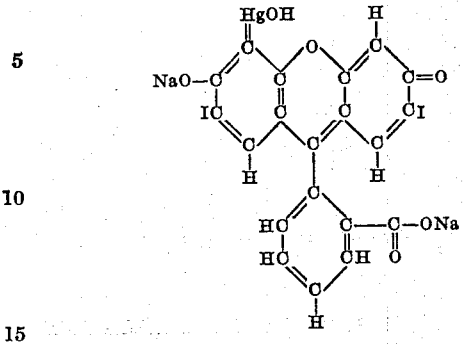

4. The herein described compound consisting of di-potassium-di-iodo-hydroxy-mercury fluorescein which corresponds to the chemical formula $C_{20}H_8O_6HgI_2K_2$, substantially as set forth.

5. The herein described compound consisting of di-ammonium-di-iodo-hydroxy-mercury fluorescein which corresponds to the chemical formula $C_{20}H_8O_6HgI_2(NH_4)_2$, substantially as set forth.

In witness whereof, I have hereunto set my hand and seal at Champaign, Illinois, this 15th day of August, A. D. nineteen hundred and thirty.

HOWARD M. CHILES.